United States Patent

Blase et al.

[11] 3,749,193
[45] July 31, 1973

[54] LOAD LIFTING VEHICLE HAVING A LATERALLY ADJUSTABLE GROUND SUPPORTED ELEMENT

[75] Inventors: Helmut Blase, Dortmund-Derne; Richard Gorl, Dortmund, both of Germany

[73] Assignee: Rheinstahl Aktiengesellschaft, Essen, am Rheinstahlhaus, Germany

[22] Filed: Aug. 6, 1971

[21] Appl. No.: 169,693

[30] Foreign Application Priority Data
Sept. 26, 1970 Germany.................. P 20 47 480.0

[52] U.S. Cl. .............................................. 180/9.48
[51] Int. Cl. ............................................ B62d 55/00
[58] Field of Search .................. 180/9.48; 280/34 R

[56] References Cited
UNITED STATES PATENTS

| | | | |
|---|---|---|---|
| 2,763,330 | 3/1956 | Potter | 180/9.48 |
| 2,894,341 | 7/1959 | Amthor | 180/9.48 |
| 3,154,164 | 10/1964 | Shaw | 280/34 R |
| 3,494,439 | 2/1970 | Kline | 180/9.48 |

FOREIGN PATENTS OR APPLICATIONS

| 1,048,722 | 11/1966 | Great Britain | 180/9.48 |
|---|---|---|---|

*Primary Examiner*—Richard J. Johnson
*Assistant Examiner*—Reinhard Eisenzopf
*Attorney*—John J. McGlew et al.

[57] ABSTRACT

A load lifting vehicle particularly an endless track crane comprises a support chassis which is centrally arranged between a travelling gear frame on each side thereof. The travelling gear frames are supported by respective support beams on each side of the chassis which are telescopic within the central chassis and which are connected to the respective gear frames. Two support beams may be provided on each side of the chassis which are arranged either so that they are offset from the beams on the other side or they are in alignment with the beams on the other side and telescoped within the chassis up to an intermediate central point. To provide for maximum contraction and lateral extension of the travelling gear frames for varying the wheel base or track bases, the travelling gear frames are advantageously provided with through openings so that the supporting beam for the travelling gear frame on the opposite side may be telescoped completely through the central changes and through an opening of the gear frames to project beyond the opposite side of the gear frames if desired during contraction of the base.

4 Claims, 8 Drawing Figures

INVENTORS
HELMUT BLASE
RICHARD GÖRL by
John J. McGlew
ATTORNEY

INVENTORS
HELMUT BLASE
RICHARD GÖRL

LOAD LIFTING VEHICLE HAVING A LATERALLY ADJUSTABLE GROUND SUPPORTED ELEMENT

BACKGROUND OF THE INVENTION

1. Field of the Invention

This invention relates in general to the construction of a device for varying the wheel base of vehicles, and in particular, to an endless track crane whose gear frames are laterally displaceable for varying the wheel base for road travel and for loading stability as required.

2. Description of the Prior Art

In known methods for varying the wheel base of a vehicle, the supporting frames are either telescoped or made variable in length by intermediate pieces, so that the traveling gear frames can be displaced laterally. Other known methods involve supporting beams which are mounted displaceably by corresponding sliding bearings located either on the chassis frame or arranged across the traveling gear frame. A disadvantage of these methods is that the wheel base can only be varied by cumbersome and time-consuming operations. In addition, with telescopic supporting beams, due to constructional reasons, the difference between the narrowest and the widest wheel base is relatively small, so that the maximum wheel base is not sufficient for the stability of the crane with maximum supporting capacity.

SUMMARY OF THE INVENTION

In a preferred construction of the invention supporting beams are secured on the inner side of each traveling gear frame and staggered laterally relative to the supporting beams of the other traveling gear frame. These supporting beams are mounted for displacement in guide beams arranged on the chassis frame and are sufficiently long so that their free end penetrates through the other traveling gear frame at the minimum wheel base position.

According to a variant of the invention, at least two hollow supporting beams are arranged on and pass through each traveling gear frame, and embrace guide beams arranged on the chassis which are of sufficient length that they penetrate through the traveling gear frame at the minimum wheel base. It is also advantageous to mount the guide beams with known fastening means, such as brackets or bolts, in the center of the chassis frame in order to be able to effectively use the maximum wheel base. Furthermore in order to avoid jamming in the guidance while the endless track crane is in the inclined position, it is advisable to provide the fastening means of the guide beams with hinges.

Accordingly, it is an object of the present invention to provide an improved method for varying the wheel base of a vehicle, which includes staggered supporting beams secured to the traveling gear frames which are mounted for displacement in guide beams arranged on the chassis.

A further object according to a variant of the invention is to provide an improved method of varying the wheel base of a vehicle by means of hollow supporting beams which pass through the traveling gear frames and embrace guide beams on the chassis.

A still further object of the present invention is to design an endless track crane such that the maximum wheel base alone ensures the stability of the crane with maximum supporting capacity.

An additional object of the present invention is to provide a means for effectively using the maximum wheel base while in an inclined position by use of brackets and hinges to fasten the above-mentioned guide beams.

For a better understanding of the present invention its operating advantages and specific objects attained by its use, reference should be had to the accompanying drawings and descriptive matter where the two preferred embodiments of the invention are represented schematically; the super-structure of the crane is not shown since it is not affected by the invention, nor is the driving system.

GENERAL DESCRIPTION OF THE PREFERRED EMBODIMENTS

Figure 1:
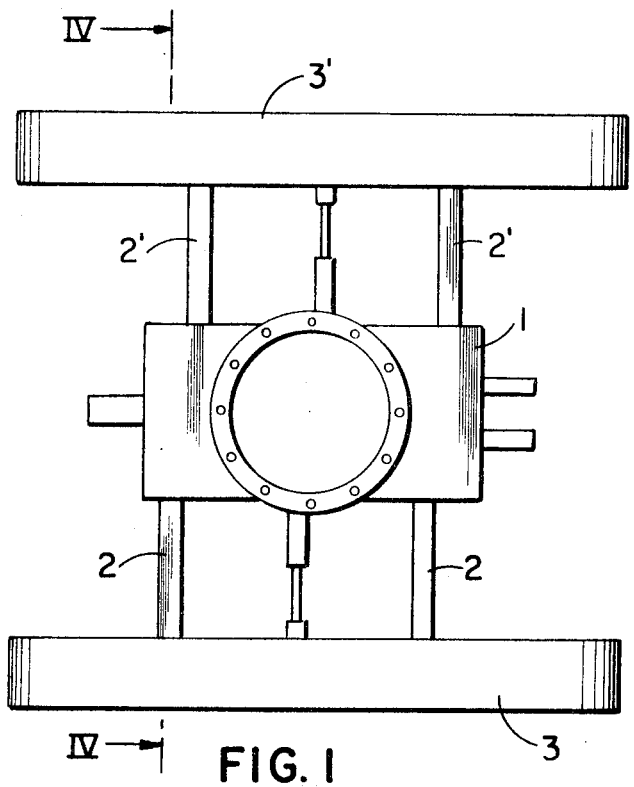
FIG. 1 shows a top plan view of the chassis frame of a crawler crane constructed in accordance with the invention and having lateral traveling gears at maximum wheel base shown along the section I—I in FIG. 3.
Figure 2:
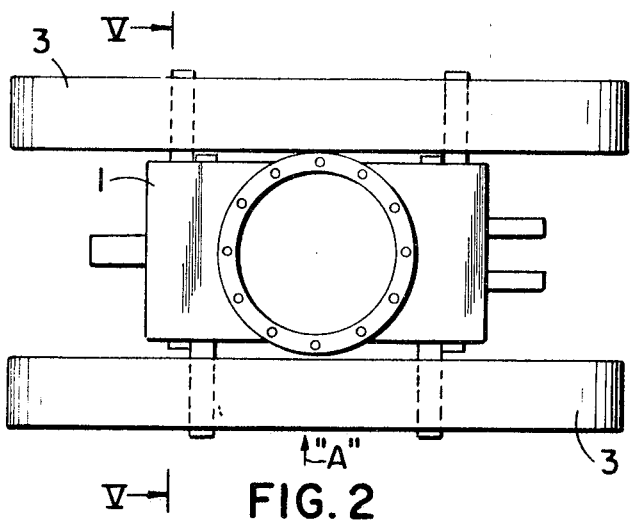
FIG. 2 is a view similar to FIG. 1 with the parts arranged for a minimum wheel base.
Figure 3:
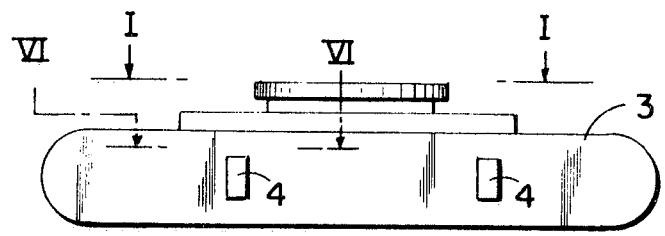
FIG. 3 is a side elevational view in the direction of arrow "A" of FIG. 2.
Figure 4:
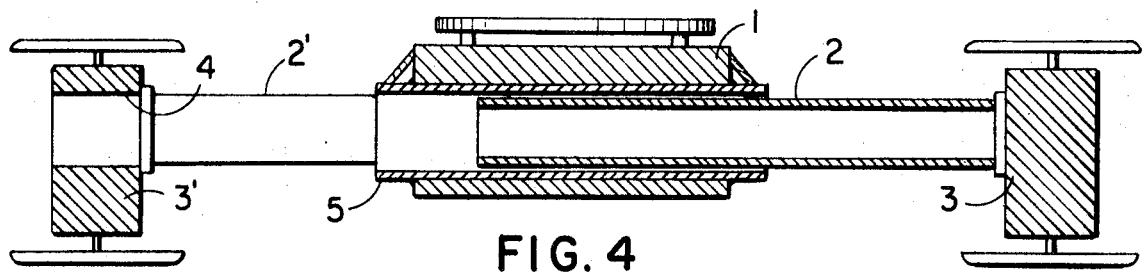
FIG. 4 is a section taken along the line IV—IV of FIG. 1.

Referring to the drawings in particular the invention embodied therein as shown in FIG. 1 to 6 comprises a load lifting vehicle particularly a crawler crane which includes a central chassis 1 for supporting the crane, having a telescopic receiving tube 5 extending completely transversely therethrough for receiving a support element or beam 2 for supporting a traveling gear frame 3 and 3' on the respective sides of the chassis. In the embodiment shown the support beam means comprises two support beams 2, 2 (2', 2' ) on each side which are telescopic within the respective tubular elements 5 which are provided on the chassis 1 for each support beam.

Figure 5:
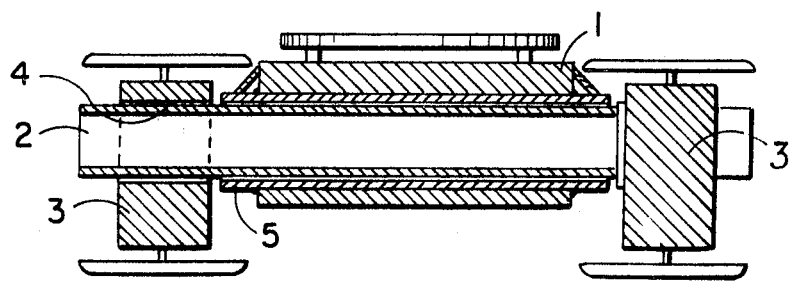
FIG. 5 is a section taken along the line V—V of FIG. 2.
Figure 6:
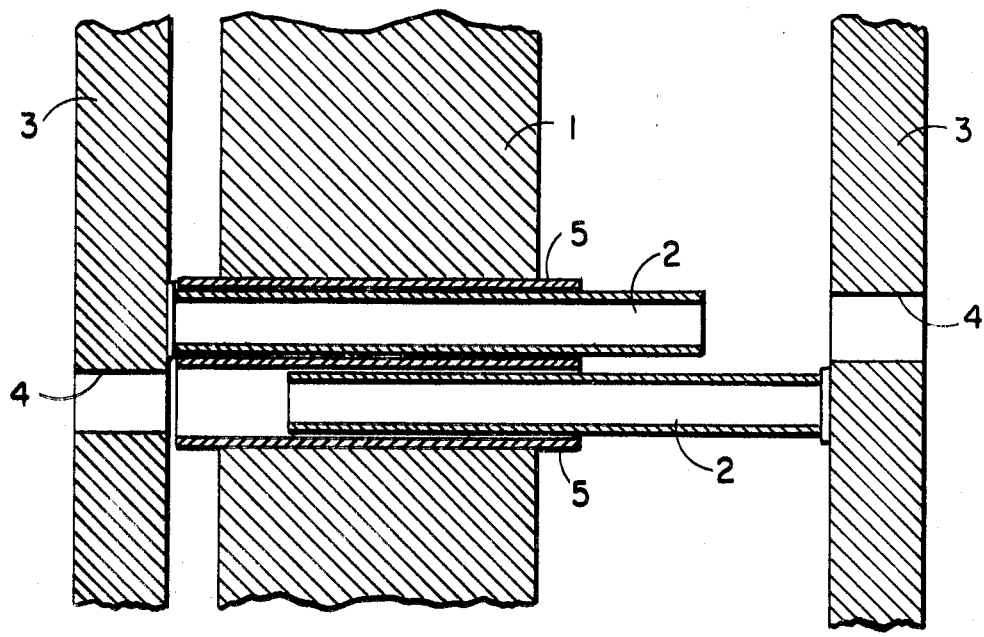
FIG. 6 shows schematic section of a view taken along the line VI—VI of FIG. 3 with a wider wheel base on only one side.

In accordance with a feature of the invention the traveling gear frame 3 which are designed to carry either wheels or guide rollers for a track are provided with through openings 4 in alignment with the support beam 2 of the opposite side so that the end of this beam may be extended through this opening when the ground gear frames are contracted as shown in FIG. 5.

In the embodiment of FIGS. 1 to 6, as shown clearly in FIG. 1, the supporting 2' on one side is offset longitudilynally from the supporting beam 2 on the other side, and they are accommodated in separate tubes 5 of the chassis 1.

Figure 7:
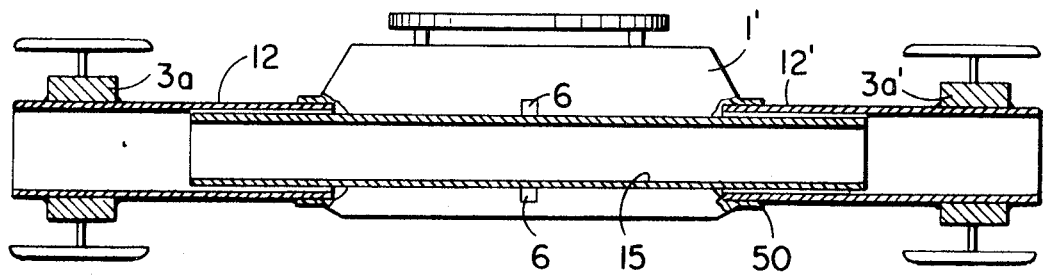
FIG. 7 and 8 are views similar to FIGS. 4 and 5 of another embodiment of the invention.
Figure 8:
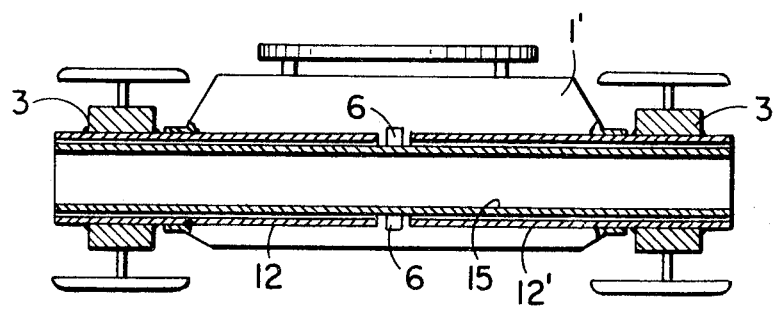

In the embodiment of FIGS. 7 and 8, however, the support beam means are in the form of hollow supporting beams 12, 12' which are coaxially arranged and are guided through peripheral openings 50 around a tubular guide member 15 which is carried within the chassis 1' and are supported on support means in the form of a bracket or hinge 6. The supporting beams 12 and 12' are telescopic over the guide tube 15 so that they can be extended or contracted as desired within the chassis 1'. In the embodiment of FIG. 7 and 8 the support beams 12 and 12' extend completely through the traveling gear frames 3a and 3a' and project outwardly on the opposite side so that the support beams 12 and 12' may be telescoped inwardly to their maximum extent as shown in FIG. 8.

While specific embodiments of the inventions have been shown and described in detail to illustrate the application of the principles of the inventions, it will be understood that the inventions may be embodied otherwise without departing from such principles.

What I claim is:

1. An endless tracked crane comprising a support chassis, first and second traveling gear frames arranged on respective sides of said support chassis for carrying elements for support movement over and for positioning in a fixed position on the ground, first and second support beams connected to respective ones of said first and second traveling gear frames, the support beams arranged in laterally offset manner on respective sides of said traveling gear frame, said support chassis having hollow guide beam means, said support beams being displaceable on said hollow guide beam means, each of said first and second gear frames having a support-beam-receiving through-opening for receiving the support beam of the opposite gear frame, said support beams being of such a length that when the traveling gear frames are moved inwardly for minimum clearance they extend through and beyond the opposite traveling gear frame.

2. An endless tracked crane according to claim 1, including means mounted on said chassis connected to said traveling gear frames for shifting said frames inwardly and outwardly.

3. An endless tracked crane according to claim 1, wherein said shifting means comprises a fluid operated piston and cylinder connected between said chassis and said gear frame.

4. An endless tracked crane according to claim 1, wherein said guide beam means comprises a hollow guide beam on said chassis for each of said first and second support beams, said support beams comprising a hollow tube slideable within said respective guide beams.

* * * * *